June 6, 1933.  J. FOLK  1,912,365
SLICING MACHINE
Filed Nov. 12, 1926   3 Sheets-Sheet 1

Inventor:
Joseph Folk
By Nissen & Crane
Attys.

June 6, 1933.  J. FOLK  1,912,365
SLICING MACHINE
Filed Nov. 12, 1926  3 Sheets-Sheet 2

Inventor:
Joseph Folk
by Nissen & Crane
Attys.

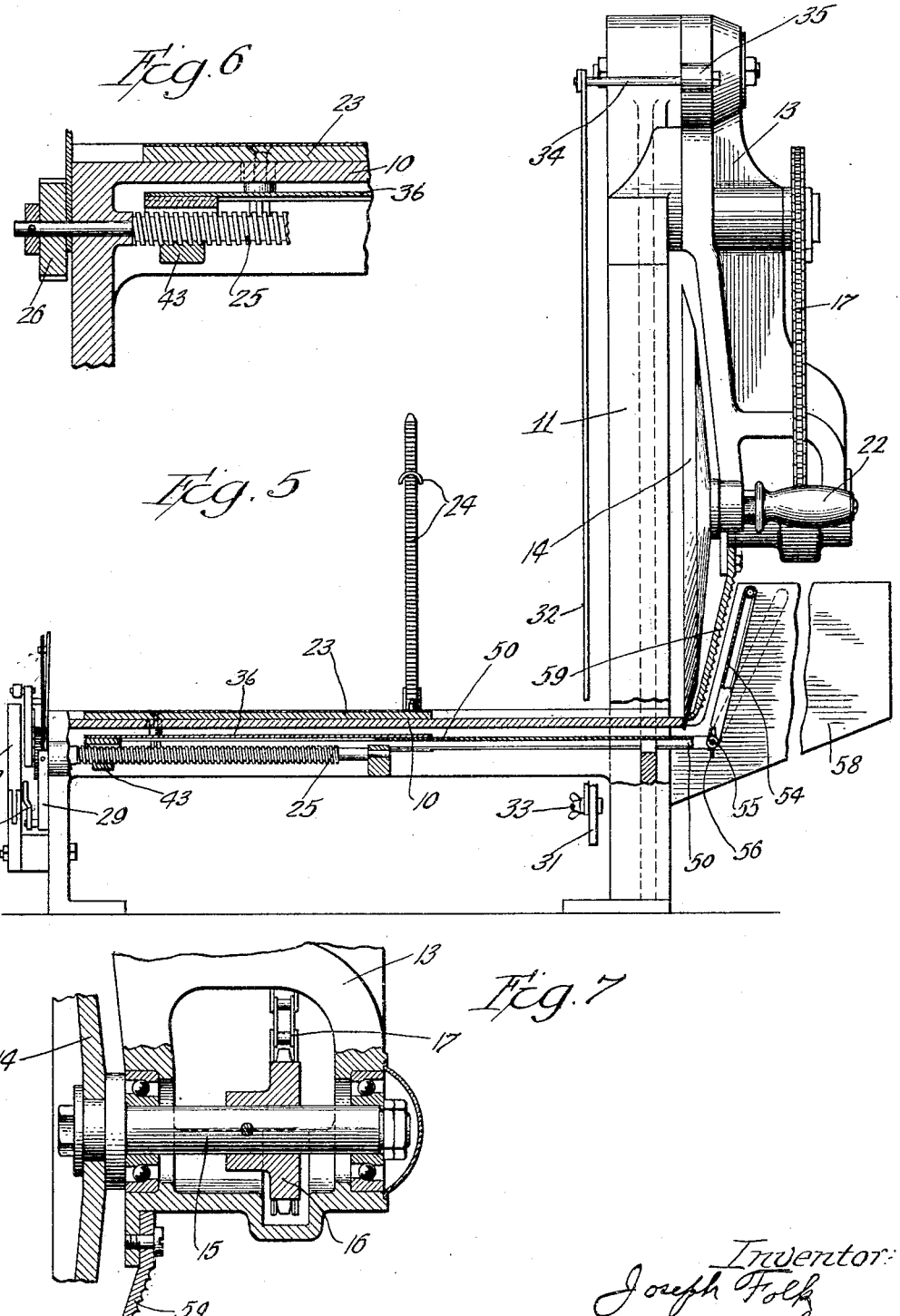

Patented June 6, 1933

1,912,365

UNITED STATES PATENT OFFICE

JOSEPH FOLK, OF LA PORTE, INDIANA, ASSIGNOR TO U. S. SLICING MACHINE COMPANY, OF LA PORTE, INDIANA, A CORPORATION OF INDIANA

SLICING MACHINE

Application filed November 12, 1926. Serial No. 147,867.

This invention relates to machines for slicing meat and other commodities and has for one of its objects the provision of a slice receiver and means for depositing slices on said receiver in an orderly pile or stack, suitable for wrapping and delivery to a customer without manual arrangement of the slices.

A further object is to provide a machine of the class named which shall be of improved construction and operation. Other objects will appear from the following description.

The invention is exemplified in the combination and arrangement of parts shown in the accompanying drawings and described in the following specification, and it is more particularly pointed out in the appended claims.

In the drawings:

Fig. 5 is a side elevation of the machine with parts in section;

Figs. 6 and 7 are fragmentary sectional views showing details.

Figure 1:
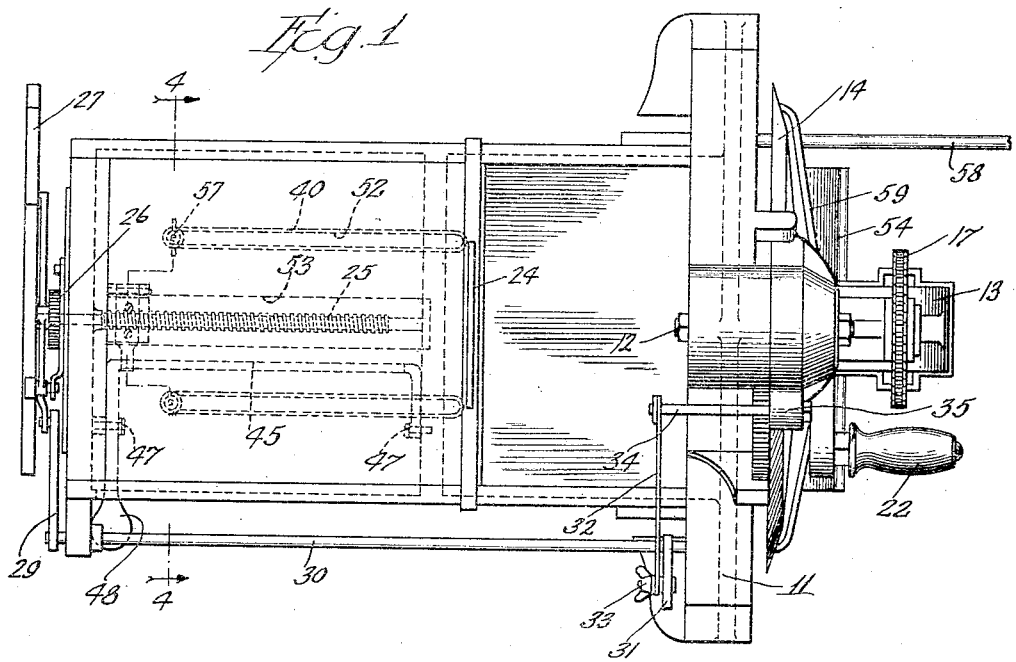
Fig. 1 is a top plan view of a slicing machine embodying the present invention.
Figure 2:
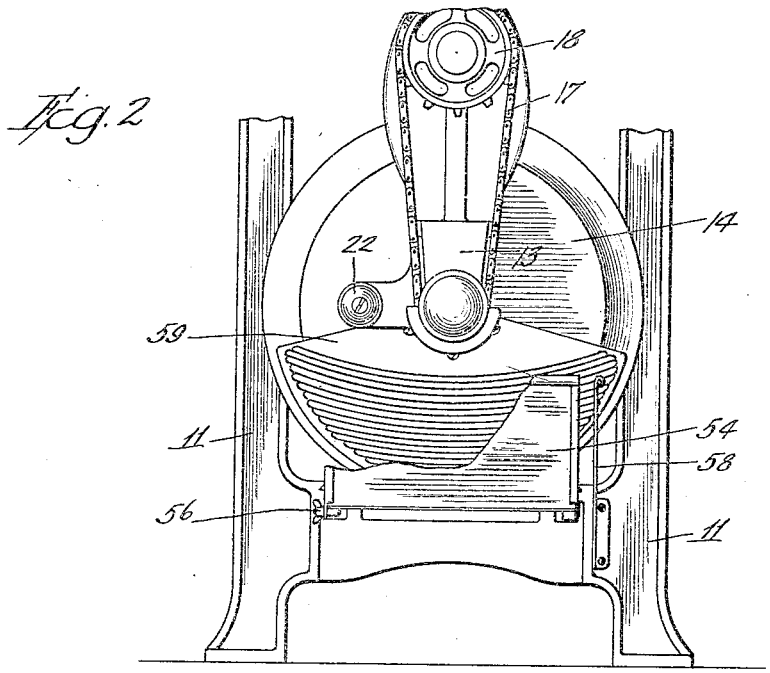
Fig. 2 is a front view of the machine shown in Fig. 1 with parts broken away.
Figure 3:
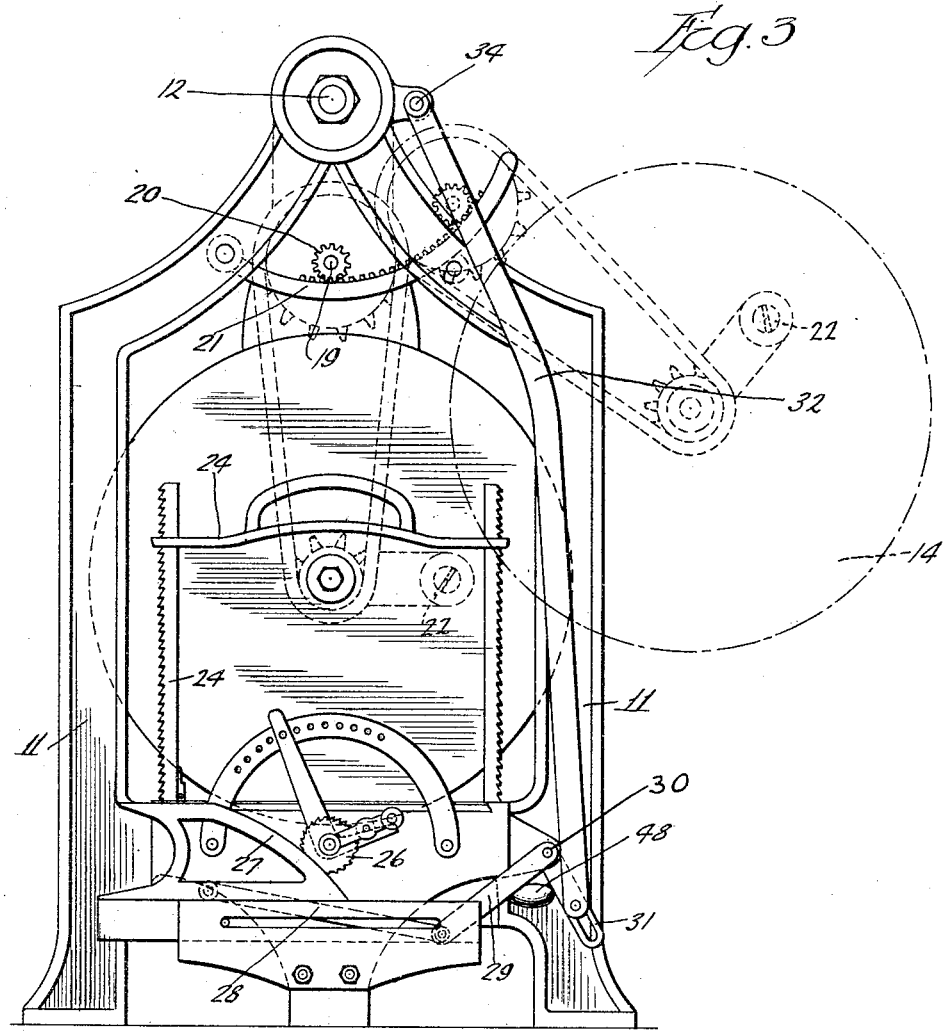
Fig. 3 is a rear view of a machine shown in Fig. 1.
Figure 4:
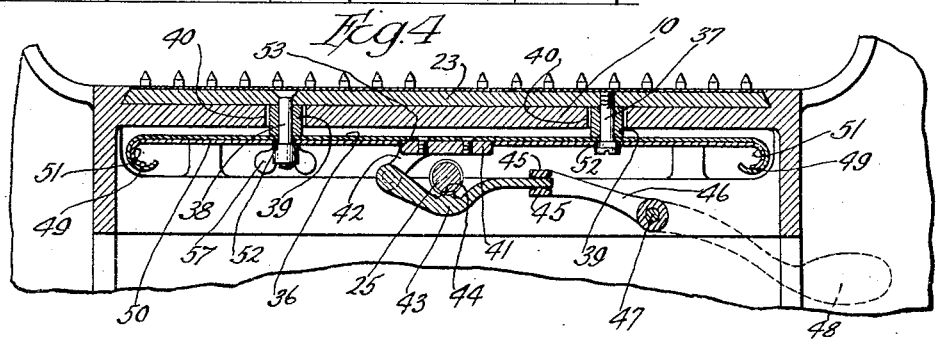
Fig. 4 is a section substantially on line 4—4 of Fig. 1.

The invention is illustrated as applied to the type of slicing machine having a stationary frame provided with a swinging arm which supports the rotary knife, such as that illustrated in the patent to W. A. Van Berkel, #635,225, granted October 17, 1899. The machine comprises a stationary base 10 having an upright frame consisting of spaced bars 11 at the forward end thereof, the bars being connected together at their tops to provide a support for a pivot pin or shaft 12 on which a swinging arm 13 is mounted. A slicing knife 14 is supported by a shaft 15 journaled at the lower end of the arm 13 in position to move past the opening between the uprights 11 when the arm 13 is swung on its pivotal support. The knife 14 is rotated by a sprocket wheel 16 secured to the shaft 15 and driven by a sprocket chain 17. The chain 17 passes over a sprocket wheel 18 which is rotated by pawl and ratchet connection with a shaft 19 in the manner described in the patent referred to above. The shaft 19 carries a pinion 20 which meshes with a segmental rack 21. A handle 22 is secured to the frame 13 at substantially the same radial distance from the pivotal support for the arm 13 as the spindle for the knife 14. A sliding work-holder 23 is mounted on the base 10 and is provided with a clamp 24 for holding the meat or other material thereon. A screw 25 is journaled in the base 10 beneath the sliding work-holder 23 and is rotated by pawl and ratchet mechanism 26 which is operated by a sliding cam 27. The cam 27 is connected by a link 28 with an arm 29 fast on the shaft 30. The shaft 30 is journaled in the base 10 and carries an arm 31 to which a link 32 is adjustably connected by a screw 33. The link 32 is pivotally connected by a pin 34 to a lug 35 on the arm 13. By this mechanism, the shaft 25 is partially rotated to feed the work support 23 toward the slicing knife 14 after each slicing operation of the knife. The mechanism for rotating the screw 25 is the same as that shown in the prior patent referred to.

Supported beneath the base 10 is a plate 36 which is connected to the work-holder 23 by screws 37 and 38. The plate 36 is held in spaced relation to the work-holder 23 by spacing collars 39 surrounding the screws 37 and 38. The base 10 is provided with slots 40 to permit longitudinal travel of the collars 39 as the work support 23 is fed toward the slicing knife. A block 41 is fixed to the lower face of the plate 36 and carries a bracket 42 having an arm 43 pivoted thereon. The arm 43 is provided with teeth 44 which engage the threads of the screw 25. The end of the arm 43 extends between spaced bars 45 which are supported by arms 46 pivotally mounted at 47 on the base 10. One of the arms 46 is provided with a weighted handle 48 which normally raises the bars 45 and holds the teeth 44 in engagement with the screw 25. As the screw rotates, the arm 43 is moved along the screw and the end of the arm slides between the bars 45. This carries the plate 36 longitudinally of the screw and the movement of the plate 36 is transmitted by the screws 37 and 38 to the work support 23 to feed the material toward the slicing knife. To release the work support from the feed mechanism, it is only necessary to raise the handle 48. This will permit the feed table to be moved by hand freely over the base 10 to any position desired.

The plate 36 has its edges rolled, as shown at 49, and an extension plate 50 has rolled edges 51 telescoping with rolled edges 49. The plate 50 has longitudinal slots 52 to permit adjustment of the plate longitudinally of the plate 36. The plate 50 is also provided with a longitudinal slot 53 to receive the block 41 and to permit the plate to slide relative to the block.

The plate 50 projects forwardly between the uprights 11 to a position in front of the knife 14. A slice supporting plate 54 is pivotally connected at 55 to the forward end of the plate 50 and may be held in different angular positions by thumb screws 56. The plate 50 telescopes with the plate 36 but may be located in different positions of adjustment relative thereto by a thumb nut 57 on the screw 38. An abutment plate 58 projects forwardly from the base 10 at the edge of the plate 54 toward which the knife 14 is moved for severing slices from the material on the work support 23. A deflector 59 is secured to the arm 13 and covers the lower portion of the knife 14, the edge of the deflector being spaced inwardly a slight distance from the cutting edge of the knife and curved to conform to the periphery of the knife. The outer surface of the deflector 59 is corrugated to provide ribs curved about the pivotal support for the arm 13 as a center.

In operation, the slices severed by the knife 14 are directed by the deflector 59 against the support 54, the lower edges of the slices being received on the plate 50. The plate 50 and the supporting plate 54 are fed forwardly simultaneously with the movement of the work support 23 to accommodate additional slices as they are formed. The adjustment between the plate 50 and the plate 36 by means of the wing nut 57 permits proper positioning of the supporting plate 54 for different positions of the work-holder 23 at the time a slicing operation is begun. If, for instance, the meat projects only a short distance from the front end of the work-holder 23 when a slicing operation is begun, the work-holder will be moved toward the knife 14, as viewed in Fig. 5, to bring the forward end of the meat into position to be cut by the knife. Since the plate 50 is connected to the work support 23 to move therewith, the forward end of the plate would be correspondingly moved away from the deflector 59. The telescoping adjustment of the plate 50 with the plate 36 permits proper positioning of the forward end of the plate 50 and the support 54 to receive the slices as they are severed. The pivotal adjustment of the support 54 permits the support to be arranged at the proper angle to hold the slices in an inclined position so that they will not buckle from their weight or slide downwardly over the supporting face of the plate 54. The position of the handle 22 permits swinging movement of the supporting arm 13 without engaging the plate 54 or the abutment plate 58.

I claim:—

1. In combination, a slicing knife, a pivotally supported arm on which said knife is journaled, means for rotating said knife when said arm is reciprocated, a work-holder disposed at one side of the cutting plane of said knife, a slice receiver disposed at the opposite side of the cutting plane of said knife, means for adjustably connecting said work-holder and slice receiver, and means for feeding said work-holder and slice receiver in unison with each other in a direction transverse to the cutting plane of said knife, said receiver being adapted to move the slices bodily away from said knife.

2. The combination with a slicing knife, of means for moving said knife to sever slices from material, a work-holder for presenting the material to said knife to be sliced, a slice receiver comprising a substantially horizontal support and an inclined support, means for supporting said work-holder and slice receiver in stationary position relative to the direction of movement of said knife, means for feeding said work-holder and slice receiver together with the slices on said receiver in unison with each other in a direction transverse to the cutting plane of said knife, and a deflector movable with said knife for directing slices as they are severed against the inclined support of said slice receiver.

3. In a slicing machine, a slicing knife, means for moving said knife to sever slices from a piece of material, means for holding the material in stationary position during slicing operations, a slice receiver for receiving the slices as they are formed, means for supporting said slice receiver against movement in the direction of movement of said slicing knife, and a deflector movable with said knife for directing the slices onto said receiver, said deflector having ribs thereon curved about the axis of the supporting arm for said knife.

4. A slicing machine comprising a stationary platform, a work support mounted on said platform and movable relative thereto, telescoping plates disposed below said platform and connected with said work support to move therewith, means for holding said plates against telescoping movement relative to each other, a slicing knife movable transversely of said platform to sever slices from material on said work support, one of said telescoping plates being arranged to extend to a position at the opposite side of the cutting plane of said knife from said work support to receive slices as they are severed by said knife.

5. A slicing machine comprising a stationary platform, a work support mounted on said platform and movable relative thereto, a slicing knife movable transversely of said platform to sever slices from material on said work support, a pair of telescoping plates disposed beneath said platform, one of said plates having a slice receiving portion at the side of said slicing knife opposite said work support, means for connecting the other of said plates to said work support to move in unison with each other, and a feed screw for moving said work support and plates relative to the cutting plane of said slicing knife.

6. A slicing machine comprising a stationary platform having a slot therein, a work support mounted on said platform and movable relative thereto, a slicing knife movable transversely of said platform for severing slices from material on said work support, a plate disposed beneath said platform, means extending through said slot for connecting said plate and work support, a feed screw, means for connecting said feed screw with said plate to feed said plate and work support toward the cutting plane of said slicing knife, said plate having rolled portions at the edges thereof, a second plate having rolled portions telescoping with the rolled portions of said first-named plate, means for holding said plates in adjusted positions relative to each other, and means on said second plate at the side of said knife opposite said work support for receiving slices as they are severed by said slicing knife.

7. A slicing machine comprising a stationary platform, a work support mounted to move along said platform, a slicing knife movable relative to said platform in a direction transverse to the direction of movement of said work support, a screw for feeding said work support toward the cutting plane of said slicing knife, a slice receiver disposed at the side of said slicing knife opposite said work support and having adjustable connection with said work support, said slice receiver having an inclined supporting surface for engaging the flat faces of the slices as they are formed by said knife, and a deflector movable with said knife for directing the slices against said slice support, said slice receiver being adapted to move the slices bodily away from said knife.

8. In a slicing machine, a stationary platform, a work support movable along said platform, a slicing knife movable relative to said platform in a direction transverse to the direction of movement of said work support, a slice receiver disposed at the side of said slicing knife opposite said work support and connected with said work support to move therewith, said slice receiver having an inclined slice support, a deflector movable with said slicing knife for directing slices against said slice support, and an abutment plate disposed adjacent the edge of said slice support toward which said slicing knife is moved during a slicing operation.

9. In combination, a slicing knife, a horizontally pivoted arm on which said knife is mounted, a deflector mounted on said arm adjacent said knife, said deflector having ribs thereon, said ribs being disposed in arcs substantially concentric with the pivot of said pivotally supported arm.

10. A slicing machine comprising a substance support, a slicing knife for cutting a substance while mounted on said support, a movable support for said knife, and a deflector carried by said movable support and having a portion thereof lying adjacent the cutting edge of said knife, said deflector being for the purposes of moving the slices as they are cut clear of the cutting plane of said knife and spaced therefrom, said deflector having raised projections thereon adapted to reduce the resistance between the slice being cut and said deflector thereby eliminating a relatively high percentage of the lateral throwing effect which said deflector has on the slices.

In testimony whereof I have signed my name to this specification on this 9th day of November, A. D. 1926.

JOSEPH FOLK.